No. 638,377. Patented Dec. 5, 1899.
E. S. BURT.
CHEESE CUTTER.
(Application filed July 20, 1899.)
(No Model.)
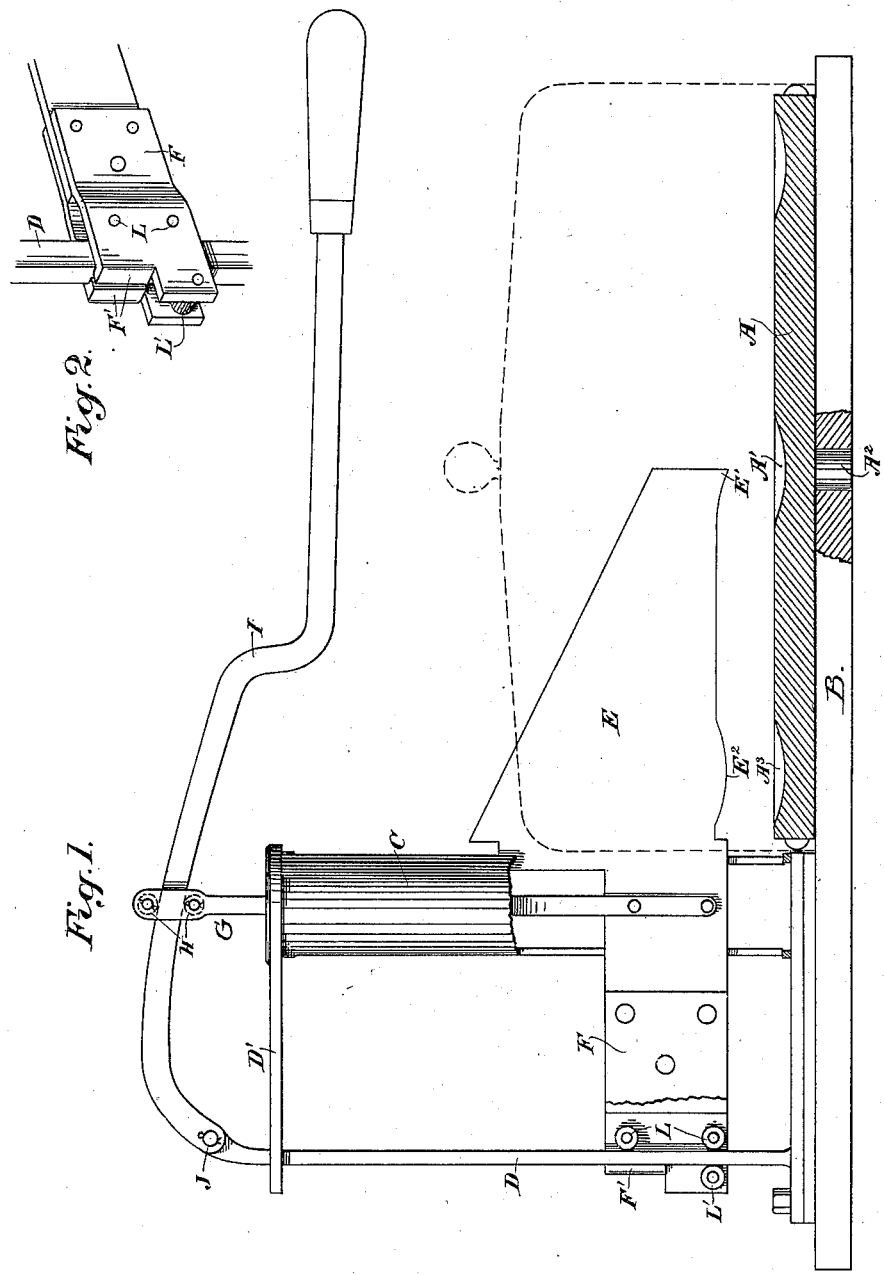
Witnesses,
Inventor,
Elkanah S. Burt
By Dewey Strong & Co.
attys

UNITED STATES PATENT OFFICE.

ELKANAH SAID BURT, OF GLENCOE, CALIFORNIA, ASSIGNOR OF TWO-THIRDS TO JEROME BURT, OF SAME PLACE, AND WILLIAM E. HOLBROOK, OF WEST POINT, CALIFORNIA.

CHEESE-CUTTER.

SPECIFICATION forming part of Letters Patent No. 638,377, dated December 5, 1899.

Application filed July 20, 1899. Serial No. 724,490. (No model.)

*To all whom it may concern:*

Be it known that I, ELKANAH SAID BURT, a citizen of the United States, residing at Glencoe, county of Calaveras, State of California, have invented an Improvement in Cheese Tables and Cutters; and I hereby declare the following to be a full, clear, and exact description of the same.

My invention relates to an improved device for carrying cheeses and a means for cutting the same into any desired sizes for sale and use.

It consists of the parts and the constructions and combinations of parts hereinafter described and claimed.

Figure 1 is a side elevation of the cutter. Fig. 2 shows the manner of connecting the rear of the knife to the standard.

A is a circular base of sufficient size to contain a cheese. I have here shown this base having a countersunk central depression A' and a suitable pin or spindle A², which extends into or through a base B, so that the support A is turnable about this spindle upon the base. Suitable projecting knobs or lugs are fixed to the periphery of the circular support, so that the latter may be easily turned as required.

The exterior of the support A has a depressed groove or channel A³ made in it for a purpose to be hereinafter described.

Upon the base B and contiguous to the periphery of the support A is fixed a hollow cylinder C, and parallel with this cylinder at a short distance in rear of it is a post D.

E is a knife by which the cheese is to be cut. This knife is made of triangular shape, being deepest at a point adjacent to the cylinder C and tapering downward toward the outer end, which stands above the central depression A' of the support A. The inner end or shank of the knife passes through slots made in opposite sides of the cylinder C, and it is bolted between clamping-plates F, by which it is carried.

Through the top of the cylinder C passes a rod G, the lower end of which is bolted to the shank of the knife where it passes through the cylinder. The upper end of this rod has journaled upon it rollers H at such a distance apart that the lever I passes freely between these rollers. One end of this lever, which is of sufficient length, forms a handle by which it may be raised or lowered. The other end is fulcrumed, as shown at J, to the top of the standard D, and when the lever is raised or lowered it will act to raise and lower the rod G and with it the knife E. An extension-plate D' projects from the top of the cylinder C and has a hole made through the rear end, through which the standard D projects, and the upper end of the standard is thus steadied and made rigid.

The lever I is made with a convex curvature in that portion which passes between the rollers H, and between it and the handle it is bent approximately at right angles, so as to make a more convenient leverage for operating the device. The convex portion of the lever is thus slidable between the rollers H and acts to raise or press down the rod G and with it the knife.

The rear ends of the plates F, between which the knife is bolted, have rollers L journaled between them, two of these rollers being journaled so as to contact with the side of the standard D nearest the cylinder, and one roller L' at the outside and bottom of the clamp-plates F travels against the outer face of the rod. Above this the upper half of these plates F are turned at right angles, as shown at F', and are thus folded in behind the standard D, against which they slide. By this construction I provide an easily-movable guide for the knife as it rises and falls which will not bind or cramp during its movements.

The lower edge of the knife E is formed as follows: The outer end has a downwardly-curved point E', which serves to first enter the center of the cheese to be cut and start with the penetration of this point and a sort of drawing cut outwardly therefrom. The portion of the knife which coincides with the depressed groove or channel A³ has a convexity made as shown at E², and this convexity fitting into the channel A³ when the knife is depressed acts to sever the cloth which is wrapped around the periphery of the cheese and extends a short distance toward the center at top and bottom, so that when the slice has been cut from the cheese it will be entirely severed therefrom and the cloth cleanly cut on the line of movement of the knife.

When the cheese is in place upon the support, it is normally inclosed by a screen or casing which protects it from the attacks of insects and the like.

Having thus described my invention, what I claim as new, and desire to secure by Letters Patent, is—

1. A cheese-cutting device consisting of a support for the cheese, a vertically-slotted guide exterior to the periphery of the support, a knife or cutter of substantially triangular shape, having the deepest portion proximate to said guide, said knife having a longitudinal stem or shank extension from its rear passing through the slots in the guide, a guide for the rear end of the shank, a lever fulcrumed to the rear guide and a rod connected with the knife and passing through the slotted guide, and loosely connected with the lever at a point between its ends.

2. A device for cutting cheese consisting of a base, a rotary cheese-support turnable thereon, a hollow vertical column fixed to the base exterior to the support and having slots or channels through the opposite sides and radially in line with the center of the cheese, a vertically-movable knife extending through said slots having the point in line above the center of the cheese, clamps between which the rear end of the knife is fixed, a vertically-fixed guide-bar around which the upper rear ends of the clamps are bent and antifrictional rollers journaled between the clamps and adapted to travel against the guide-bar.

3. A device for cutting cheese consisting of a base, a rotary cheese-support pivoted and turnable upon the base having exterior knobs by which it may be moved, a hollow column slotted upon opposite sides in line with the center of the cheese, a knife extending through said slots and projecting over the cheese, clamps behind the column between which the rear end of the knife is secured, a vertically-fixed guide-bar around which the upper portion of the rear ends of the clamps are bent, a roller journaled between the clamps in line with the bent upper portion and a pair of rollers journaled between the lower ends of the clamps upon each side of the bar, a rod, the lower end of which is fixed to the knife within the column, a guiding-cap through which the upper end of the rod passes, a fulcrumed lever engaging the upper end of the rod whereby it and the knife and the guides are vertically movable.

4. A cheese-cutting device consisting of a horizontally-rotatable cheese-support, and means for turning it, a hollow column slotted upon opposite sides having a central perforated cap, a vertical guide-bar parallel with and at the rear of the column, a supporting-plate extending from the top of the column to the guide-bar, a knife extending through the slotted column, clamping-plates at the rear of the column in which the rear end of the knife is bolted, guide flanges and rollers within the clamping-plates adapted to travel upon the vertically-fixed guide-bar, a rod fixed to the knife within the column and extending through the guide-hole in the top thereof, a lever having one end fulcrumed to the top of the fixed exterior guide-rod, rollers journaled in the top of the knife-actuating rod between which the lever passes and by the movement of which it is reciprocated.

In witness whereof I have hereunto set my hand.

ELKANAH SAID BURT.

Witnesses:
MONTROSE WASHBURN,
H. BEAUCHEMIN.